July 17, 1923.
E. F. BRITTEN, JR
1,462,059
AUTOMATIC CARRIAGE RAISING MEANS FOR CALCULATING MACHINES
Filed Aug. 3, 1920
2 Sheets-Sheet 1
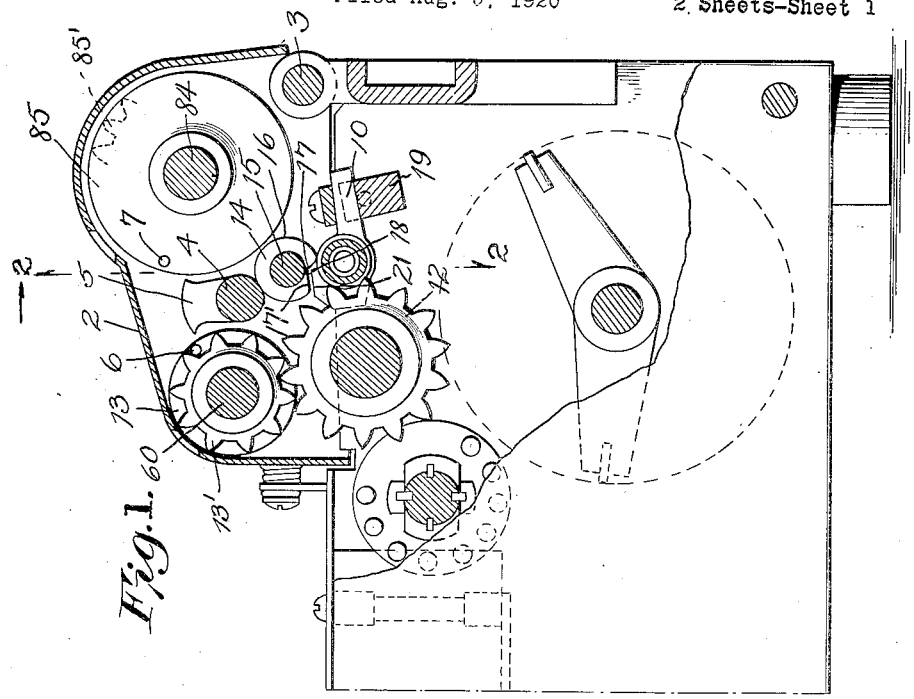
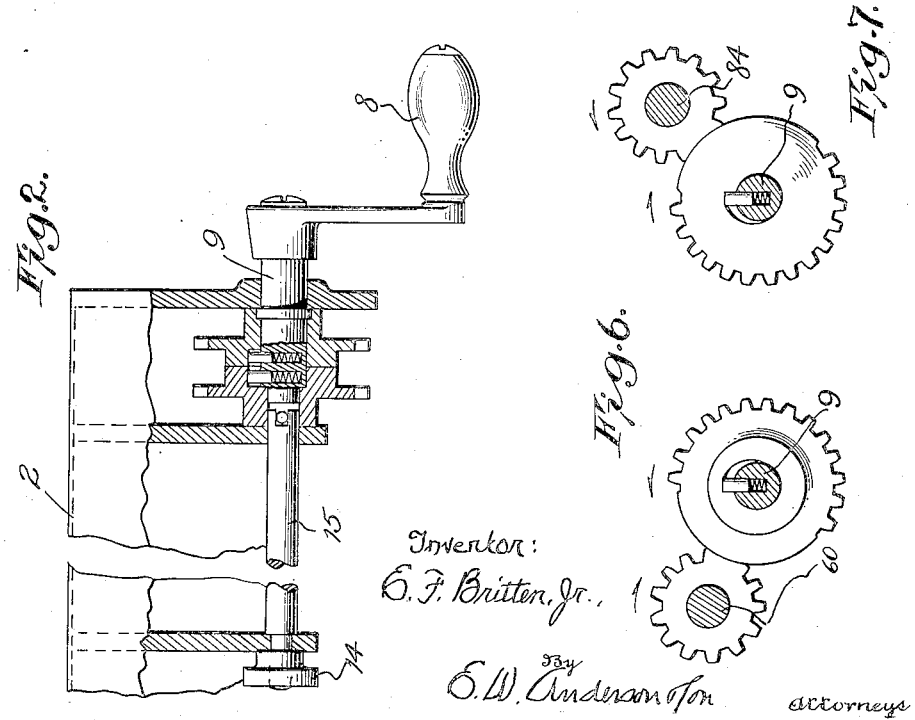
Inventor:
E. F. Britten, Jr.,
By E. W. Anderson Jon
attorneys

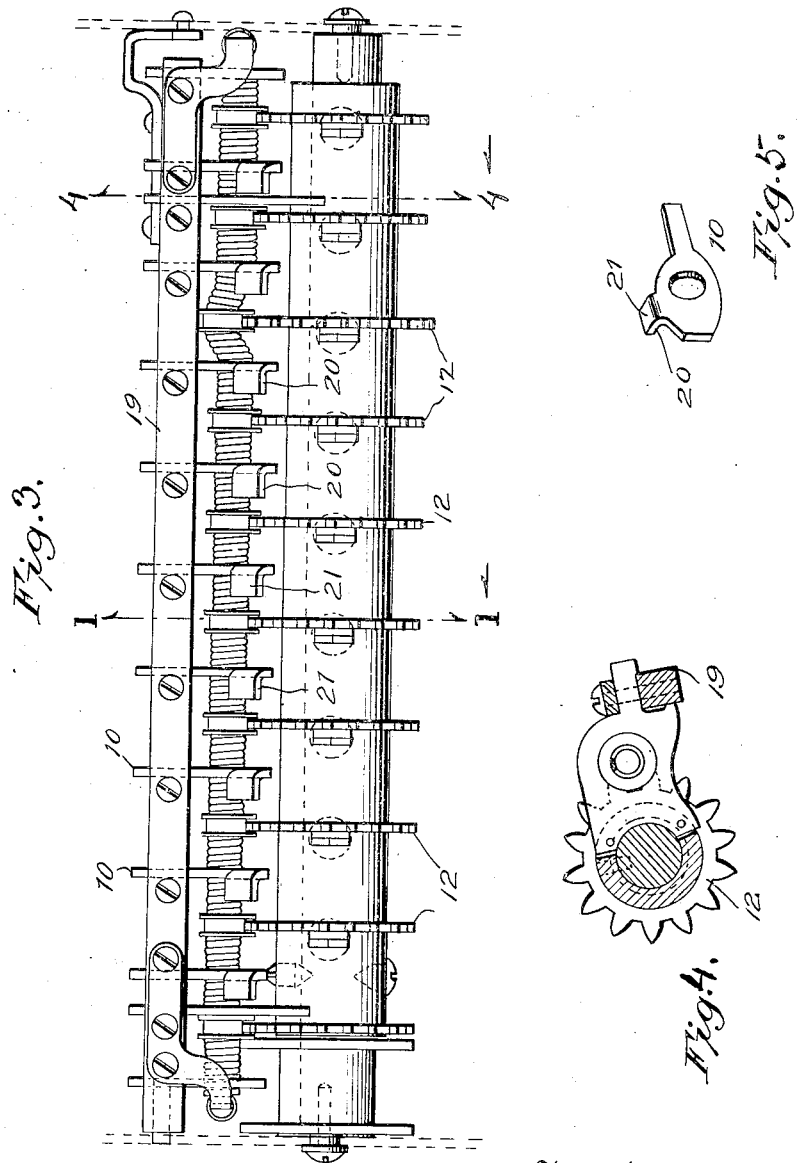

Patented July 17, 1923.

1,462,059

UNITED STATES PATENT OFFICE.

EDWIN F. BRITTEN, JR., OF MAPLEWOOD, NEW JERSEY, ASSIGNOR TO MONROE CALCULATING MACHINE COMPANY, OF NEW YORK, N. Y., A CORPORATION OF NEW YORK.

AUTOMATIC CARRIAGE-RAISING MEANS FOR CALCULATING MACHINES.

Application filed August 3, 1920. Serial No. 400,972.

*To all whom it may concern:*

Be it known that I, EDWIN F. BRITTEN, Jr., a citizen of the United States, resident of Maplewood, in the county of Essex and State of New Jersey, have made a certain new and useful Invention in Automatic Carriage-Raising Means for Calculating Machines, and I declare the following to be a full, clear and exact description of the same, such as will enable others skilled in the art to which it appertains to make and use the invention, reference being had to the accompanying drawings, and to letters or figures of reference marked thereon, which form a part of this specification.

Figure 1 is a section on the line 1—1, Figure 3, also showing the carriage and some other parts of the machine.

Figure 2 is a section on the line 2—2, Figure 1, also showing the operating crank.

Figure 3 is a detail plan view of the over rotation check devices.

Figure 4 is a section on the line 4—4, Figure 3.

Figure 5 is a detail perspective view of one of the bracing members or fingers.

Figure 6 is a detail face view of the gear connection between the operating shaft and the lower or principal numeral wheels.

Figure 7 is a similar view of the gear connection between the operating shaft and the upper or secondary numeral wheels or dials.

The invention has relation to means for automatically raising the hinged carriages of calculating machines of the type of the reissue patent to Baldwin, No. 13,841, of Dec. 8, 1914, and to maintain the carriage in raised position while the register wheels are being cleared or set back to zero, being an improvement upon the device of the patent to Phinney, No. 1,335,349, of March 30, 1920.

An object of the invention is to provide means in substitution of the rod 19 of the patent to Phinney stated which will be rigid against the downward strain thereon of the carriage lifting cam, and which will be adapted to form a more extended bearing surface for said cam. Incidentally it is found that the stiffening and bracing members or fingers 10 of the patent to Phinney No. 1,349,628, can be utilized in the present case as respective bearings for the carriage lifting cam, whereby said members or fingers have a double function.

The invention consists in the novel construction and combinations of parts, as hereinafter set forth.

In the accompanying drawings, illustrating the invention, the numeral 2 designates the endwise-shiftable carriage, pivoted in rear at 3, said carriage having mounted thereupon a series of register wheels 13 and parallel series of register wheels 85, the wheels 13 carrying each a gear 13' and the wheels 85 carrying each a gear 85'. Between and parallel to the two series of register wheels is located a rod 4, having a series of radial projections 5, 5, spaced apart and normally located without the path of movement of pins 6 and 7 of the register wheels, said bar having bearings in the carriage, so that the bar and its projections may be rocked to one side or the other. An operating handle or crank 8 is carried by a rotary shaft 9, said shaft having driving connection with the shafts 60 and 84 of the dials and being adapted upon rotation of the crank handle in one direction to rotate the one series of dials and upon rotation thereof in the opposite direction to rotate the other series of dials.

The crank handle being rotated as stated, means are provided to thereby automatically raise the carriage upon its pivot and disengage the gears 13' from the intermediate gears 12, and maintain the carriage in raised position while the principal dials are being cleared, or during the rotation of the crank handle 8 in one direction, said means consisting of a cam 14, fast upon a rotary shaft 15, driven from the dial-clearing crank 8 and having a circumferential portion 16 and inwardly extending ends 17, 17', forming a recess or cut-away portion 18, wherein fits normally one of the aforesaid fingers or check spring bracing and supporting members 10, the latter being of thin, flat form, stamped from sheet metal, and located one midway between each pair of intermediate gears 12. These members or fingers 10 are clamped to the bar 19, of the framing, and being vertically disposed, are quite rigid, against downward strain such as is caused by the carriage lifting cam.

The carriage being raised upon its pivot and shifted endwise, space by space, always comes to rest with the cam 14 immediately over one of said members or fiingers 10, the latter located in the recess 18, the end wall 17 of the cam recess being approximately radial and being adapted to contact with the finger 10 and raise the carriage quickly and completely and to instantly disengage the gears 12 and 13' at the start of the rotation of the crank handle 8, the other end wall 17' of the cam recess being of lesser chordal relation to the circumferential cam surface and adapted to contact with the said finger 10 to lower the carriage gradually to rest, with the finger 10 again engaging the cam recess.

Each of the members or fingers 10 is provided with a laterally bent or turned lug or extension 20, having a plane or flat top 21 against which the end walls of the cam recess bear in raising and lowering the carriage and upon which the circumferential surface of the cam rides to maintain the carriage in raised position, thereby providing a more extended bearing surface for the cam than does the rod 18 of said patent, to distribute the wear.

I claim:—

1. In a calculating machine, a series of gears, an endwise shiftable carriage having a series of numeral wheels provided each with a gear normally in mesh with the related gear of said series, means for setting said numeral wheels to zero, and means cooperating therewith for automatially moving said gears out of mesh and for so holding them during the zero setting, including a rotary cam mounted on the carriage and a series of space stationary transverse frame members disposed in parallel vertical planes and adapted respectively to form a bearing for said cam.

2. In a calculating machine, a series of gears, an endwise shiftable pivoted carriage having a series of numeral wheels provided each with a gear in mesh with the related gear of said series, means for setting said numeral wheels to zero, and means cooperating therewith for automatically raising the carriage and holding it raised during the zero setting, including a rotary cam mounted on the carriage and a series of spaced stationary transverse frame members disposed in parallel vertical planes at right angles to the shaft of said cam and having each a horizontally bent extension adapted to form a bearing for said cam.

In testimony whereof I affix my signature in presence of two witnesses.

EDWIN F. BRITTEN, Jr.

Witnesses:
ALICE M. HULBERT,
F. W. DEMAREST, Jr.